June 27, 1967    H. J. CARL    3,327,994

POLYTETRAFLUOROETHYLENE VALVE ASSEMBLY

Filed Feb. 25, 1965

United States Patent Office 3,327,994
Patented June 27, 1967

3,327,994
POLYTETRAFLUOROETHYLENE VALVE
ASSEMBLY
Henry J. Carl, Mineola, N.Y., assignor to Tri-Point Industries Inc., Commack, N.Y., a corporation of New York
Filed Feb. 25, 1965, Ser. No. 435,218
5 Claims. (Cl. 251—368)

This invention relates to improvements in valves, and more particularly to improved chemical resistant valves having coupled polytetrafluoroethylene plastic parts.

Fluorocarbon plastics, especially polytetrafluoroethylene which is commercially known by the name of Teflon—a product of E. I. du Pont de Nemours & Co., are characterized by a combination of outstanding properties including: inertness to almost all chemicals, nonstick surfaces and low coefficient of friction, resistance to both high and low temperatures, excellent dielectric properties, zero moisture absorption, and toughness. Accordingly, manually controlled valves for corrosive fluids may be designed with polytetrafluoroethylene stems and knobs. By turning the knob attached to one end of a screwable stem, such valves may be opened or closed. Heretofore, a plastic knob was attached to a shaft by aligning holes drilled in the separate parts and pressing in a pin. This assembly method was costly and time consuming. Under stress, the plastic knob would creep and loosen, impairing control. The failure of a plastic pin in shear, permitted the knob to spin uselessly. Now however, in this invention, polytetrafluoroethylene knobs and valve stems are coupled together without pins, adhesive, inserts, or any other third element to form a self-locking, non-rotatable coupling, providing positive control and reliability. The plug or male half of this novel coupling is integral with the valve stem, while the receptacle or female half of the coupling is integral with the knob. Coacting in this manner, the separate parts of the valve perform an additional and different function. The number of parts required are reduced and they cost less to make. Appearance of the knob is improved as the receptacle in the knob extends axially from one face only, and pin holes are eliminated. Valves of this design may be quickly and easily assembled by press fitting the parts together. No special tools are required. Pull strength of the joint is high and is unaffected by time and temperature. Maximum separation force depends upon such parameters of the parts as tensile strength, modulus of elasticity, shape, and dimensions. Although fluorocarbon plastics have been mentioned, for specific applications properly designed plugs and receptacles can be made from other plastics and metals having the required combination of properties. Only the fluorocarbon plastics and most notably polytetrafluoroethylene, have the unique combination of properties including chemical and heat resistance, non-stick low friction surface, low dielectric constant and dissipation factor, and toughness, required in chemical valves and high frequency joints.

The present invention has for one of its objects the provision of an improved chemical resistant valve having a novel stem and knob made from polytetrafluoroethylene plastic and joined together by a novel, internal, self-locking, and non-rotatable coupling.

Another object of this invention is to provide an improved chemical resistant valve having a novel polytetrafluoroethylene plastic stem and knob, each having the added function of being one-half of a new and improved self-locking, non-rotatable coupling designed to withstand high axial pull-strength.

A further object of this invention is to provide a novel, inexpensive, two piece, self-locking coupling having a high resistance to axial separation, maximum torsional holding capacity, and good appearance for joining fluorocarbon plastics such as polytetrafluoroethylene, to themselves, to other plastics, or to metals, without the presence in the joint of threads or a third element such as dowel pins, adhesives, or inserts.

Still another object of this invention is to provide a new and improved coupling whose elements may be inexpensively mass produced and quickly assembled in a self-locking, non-rotatable joint having a high resistance to axial separation even when exposed to wide variations of temperature and humidity.

Another object of this invention is to provide an improved self-locking and non-rotatable plastic to plastic or plastic to metal coupling that is assembled by simple, economical, and rapid means such as pressure or shrink fitting, and whose unusually high axial pull-strength is not diminished with time.

Yet another object of this invention is to provide a novel coupling means for joining together polytetrafluoroethylene plastic parts wherein the coupling elements are integral with the parts to be joined and no third element or material is present in the joint.

A further object of this invention is to provide a novel internal coupling linking a plurality of plastic shafts or a combination of plastic and metal shafts in a self-locking non-rotatable manner.

Further objects of the invention will presently appear as the description proceeds in connection with the appended claims and the annexed drawings wherein:

Figure 1:
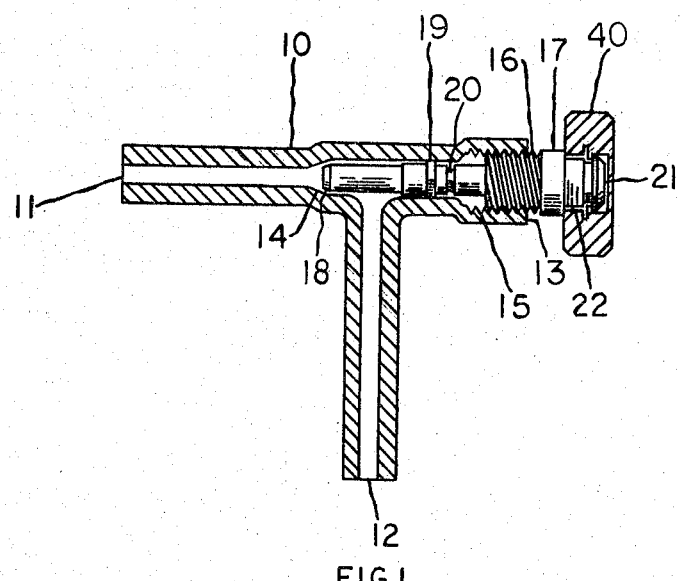
FIG. 1 is a side view, partly in cross section, showing one embodiment of the invention.

In accordance with the present invention, there is illustrated in FIG. 1, T-shaped needle valve body 10 comprised of three tubular interconnecting ports designated inlet and outlet ports 11 and 12 and partially threaded port 13. While the central axes of ports 11 and 12 are angularly separated, ports 11 and 13 are in tandem and have a common central axis. Valve seat 14, shaped like a truncated cone, is formed at the intersection of the bore of port 13 with the smaller bore of port 11. Internal threads 15 near the front end of port 13 form a tight fit with the threaded portion 16 of stem 17 in order to reduce backlash when stem 17 is rotated. Valve stem 17 is adapted to move in an axial direction within port 13 and has a rear end 18 shaped to conform with valve seat 14 upon contact. Sealing band 19 is integral with stem 17 and makes a tight fit with the bore of port 13. Circular groove 20 is designed to accommodate an O-ring gasket (not shown in FIG. 1) for use when sealing band 19 is insufficient. Plug 21, integral with stem 17 at its front end, is depicted in FIG. 1 coupled to knob 40 by engagement with receptacle 22. Plug 21 and receptacle 22 are shown enlarged in FIG. 2 and will be described later in greater detail.

Needle valve 10 in FIG. 1 is closed by turning knob 40 clockwise thereby screwing male thread 16 on stem 17 into the threaded portion 15 of port 13 until the rear end 18 of stem 17 seals against valve seat 14 and closes the passageway between ports 11 and 12. Valve 10 is opened by turning knob 40 counter-clockwise. Rear end 18 of stem 17 is thereby moved away from seat 14, and the passageway between ports 11 and 12 is opened. In addition to reducing backlash, fine threads 15 and 16 assure precise fluid metering control and permit calibration for repeatability in operation. Leakage of fluid or gas across threads 15 and out port 13 is prevented by sealing band 19, which is integral with stem 17 and bears tightly against the inside walls of port 13. When valve body 10 and stem 17 are made from dissimilar materials having a large difference in volumetric expansion, additional sealing for high and low temperature cycling applications may be provided by means of a fluoroelastomer O-ring seal (not shown here) in O-ring groove 20. High temperature valves having unsurpassed chemical and shock resistance are made according to this invention entirely from polytetrafluoroethylene plastic. The inherent non-stick surface of this plastic keeps threads 15 and 16 from seizing. Furthermore, because of the low coefficient of friction of polytetrafluoroethylene, no lubrication of the parts is necessary. This eliminates a source of contamination. Also, assembly of the knob 40 and stem 17 is facilitated during press fitting, and the tough elastic nature of this plastic assures a tightly locked permanent coupling. In certain applications, the parts may be made from other materials, for example, the valve body made from glass and the stem and knob made from polytetrafluoroethylene or another suitable plastic.

Figure 2:
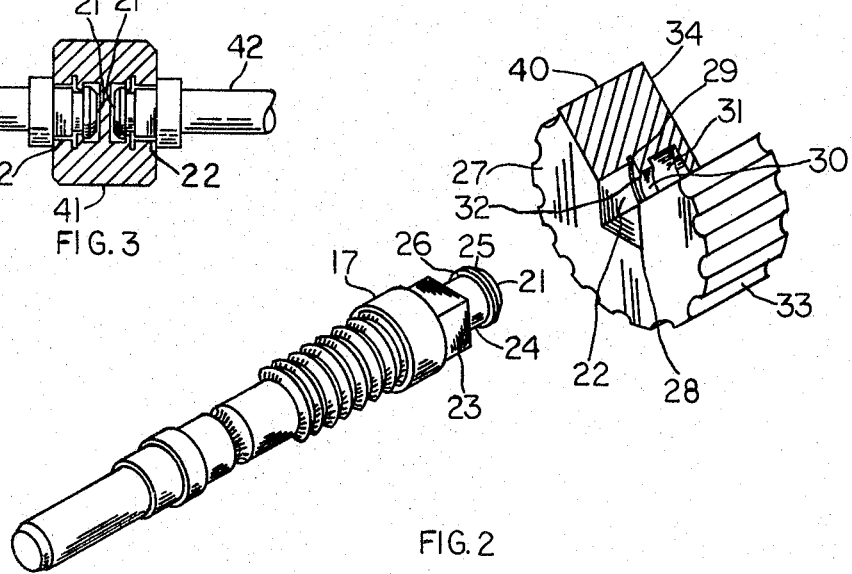
FIG. 2 is an enlarged exploded view in perspective of the valve stem and knob depicted in FIG. 1, and which reveals the coupling receptacle by means of a partial cut away cross sectional view of the knob.

In FIG. 2, an exploded view of the two element polytetrafluoroethylene plastic coupling described in FIG. 1 is depicted. Plug 21 integral with valve stem 17 and formed on its front end and receptacle 22 integral with knob 40 and formed at its hub are shown in FIG. 2 enlarged and in perspective. A partial cut-away cross sectional view of knob 40 reveals receptacle 22. Plug 21 has a rectangular prismoidal shaped rear portion 23, a cylindrical shaped central portion 24, and a short truncated conical shaped front end 25 having a base 26. Receptacle 22 is configured to receive and tightly hold plug 21. The longitudinal axis of receptacle 22 extends inwardly from the rear face 27 of knob 40 and includes in tandem the following coaxial cavities: rectangular shaped hole 28 for tightly holding the rectangular prismoidal shaped rear portion 23 of plug 21; annular groove 29 for chip cut off during the broaching of rectangular hole 28; ring-shaped hole 30 having a diameter slightly less than the diameter of base 26, for holding central portion 24 of plug 21; and blind ring-shaped hole 31 having a diameter slightly greater than the diameter of base 26, for holding the front end 25 of plug 21.

Knob 40 may be quickly and easily assembled to stem 17 by first inserting plug 21 into receptacle 22, then rotating the stem and knob until the rectangular rear portion 23 of plug 21 slides into rectangular hole 28, and finally pressing front end 25 of plug 21 past ledge 32 and into blind hole 31. Knob 40 is prevented from turning on stem 17 by the mating of rectangular portion 23 of plug 21 with rectangular shaped hole 28 in the knob. Ledge 32 at the interface of stepped tandem holes 30 and 31 supports the underside of base 26 on the front end 25 of plug 21, preventing disengagement of the coupling. Thus plug 21 and receptacle 22, the two elements of this internal coupling, are self-locked and non-rotatable and require no third element, adhesive, or threads in the coupling. During the last step of the assembly involving interference pressing of front end 25 into hole 30, the hole is temporarily expanded and the front end of the plug is slightly contracted. However, by proper design and selection of materials, elastic limits are not exceeded and plastic memory will return the parts to their original dimensions. Once assembled, the parts are in a relatively unstressed condition. The overlap of base 26 on ledge 32 is sufficient so that dimensional changes in the knob and stem due to changes in temperature and humidity will not affect the pull-out strength of the coupling. The appearance and external surfaces of the knob and stem are unaltered by this novel internal coupling means since receptacle 22 extends inwardly from rear surface 27 of knob 40 and does not intersect with the front surface 34; furthermore, dowel pins, pin holes, or set screws are not used to secure the knob on the stem. Serrations 33 along the sides of knob 40 provide improved gripping. The separate elements of the coupling may be inexpensively made by automatic screw machine or other high production equipment. Assembly of the elements may be facilitated by cooling stem 17 and heating knob 40. The toughness, elasticity, and low coefficient of friction of polytetrafluoroethylene and similar plastics make them especially suitable in the making and assembly of these elements.

Consistent with applicable design parameters, a coupling having optimum pull-strength will have locked together a plug 21 having a base 26 with a maximum possible diameter and a receptacle 22 having a hole 30 with a minimum possible diameter. Of course this presupposes that the design will permit the separate parts to be pressed together. Knob 40 must be proportioned so that the rear end 18 of stem 17 may be properly seated without overstressing valve body 10 in tension. The plug and receptacle mating rectangular portions 23 and 28 must be proportioned to transfer the full closing torque from the knob to the stem without excess straining. In the design of this coupling, one must consider the allowable tensile stress, modulus of elasticity, and geometry of the coupling elements. The relationship of these parameters may be shown by Equations 1 and 2 below.

$$D_p - D_r = \frac{T_k}{E_p} D_p \frac{W+1}{W} \quad (1)$$

Where:

$D_p$ = Diameter of base 26 of plug 21, inches
$D_r$ = Diameter of hole 30 in receptacle 22, inches
$T_k$ = Allowable tensile stress in knob 40, pounds per sq. inch
$E_p$ = Modulus of elasticity of plug 21, pounds per sq. inch
$R_k$ = Radius of knob 40, inches
$W$ = Geometry factor $$W = \frac{1 + \left(\frac{D_p}{2R_k}\right)^2}{1 - \left(\frac{D_p}{2R_k}\right)^2} \quad (2)$$

The following problem illustrates how Equation 1 may be used to design a plastic to plastic coupling such as the stem and knob made from polytetrafluoroethylene and depicted in FIG. 2. Problem: To provide optimum coupling strength, find the diameter of hole 30 in receptacle 22 when the outside diameter of knob 40 is one inch and the diameter of base 26 of mating plug 21 is 0.500 inch.

Solution.—Substitute the following values in Equations 1 and 2: $T_k$=2,600 p.s.i.; $D_p$=0.500 inch.; $E_p$=50,000 p.s.i.; $R_k$=0.500 inch.

Solve for $D_r$, the diameter of hole 30.

$$D_r = 0.458 \text{ inch}$$

Figure 3:
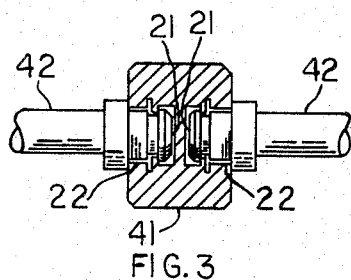
FIG. 3 is a side view, partly in cross section, showing the coupling of FIG. 1 and FIG. 2 adapted to join a plurality of shafts.

In FIG. 3 there is depicted the coupling of FIGURES 1 and 2 adapted to join a plurality of shafts in a self-locking and non-rotatable manner. By such means, two or more shafts made from dissimilar materials, including metals and plastics, may be quickly and securely connected without using screw threads, pins, set screws, or bonding agents and adhesives. Female connector 41 comprises two coaxial receptacles 22 placed back to back. The male portion of the coupling, plug 21 terminates one end of each of the two shafts 42. Receptacles 22 and plugs 21 have been described previously with FIGURES 1 and 2; also, their design, manufacture, assembly, and materials of construction likewise, have been discussed. As a typical application, remote operation of the needle valve shown in FIG. 1 may be accomplished by replacing knob 40 with the coupling shown in FIG. 3, joining plug 21 to shaft 42.

While the invention has been described in its preferred embodiments, it is understood that the words which have been used are words of description rather than of limi-

What is claimed is:

1. In a valve for fluids, a body portion comprising three interconnecting tubes including an inlet tube, an outlet tube, and a tube having a partially threaded bore; a polytetrafluoroethylene plastic stem longitudinally disposed in said threaded tube and provided with screwable adjusting means to regulate the extent of the closing movement of said stem, a plug integral with said stem and forming its front end, said plug having a rectangular prismoidal shaped rear portion, a ring-shaped central portion, and a short truncated cone shaped front portion; a polytetrafluoroethylene plastic knob coupled to said stem for manually turning said screwable adjusting means, said knob having a rear face, a front face, and a receptacle integral with said knob and formed at its hub, said receptacle having a central axis extending inwardly from said rear face only and having the following cavities in sequential axial alignment, a rectangular shaped hole, an annular groove, and first and second ring-shaped stepped holes, said first stepped hole having a diameter less than the diameter of said front portion of said plug, and said second stepped hole having a diameter greater than the diameter of said front portion of said plug; said rectangular prismoidal shaped rear portion of said plug received in said rectangular hole in said receptacle to prevent said knob rotating on said stem, said central portion and front portion of said plug being respectively received in said first and second stepped holes in said receptacle with the underside of said front portion of said plug bearing on the interface between the first and second stepped holes in said receptacle, forming a self-locked and non-rotatable coupling.

2. In a needle valve for fluids comprising a tubular body, a screwable polytetrafluoroethylene plastic stem longitudinally disposed within said body to regulate the flow of fluid therein, and a polytetrafluoroethylene plastic knob coupled to said stem for manually turning said screw; the internal coupling for fixing said knob to one end of said stem comprising a plug and receptacle, said plug being integral with and terminating one end of said stem and having a rectangular prismoidal shaped rear portion, a ring-shaped central portion, and a short truncated conical shaped front portion; said receptacle being integral with said knob and comprising the following coaxial cavities in tandem and disposed inwardly from one face, a rectangular shaped hole, an annular groove, a first ring-shaped hole having a diameter less than the base diameter of said truncated conical shaped front portion of said plug, and a blind second ring-shaped hole having a diameter greater than the base diameter of said truncated conical shaped front portion of said plug; said rectangular prismoidal shaped rear portion of said plug received in said rectangular hole in said receptacle to prevent rotation of said knob on said stem, said truncated conical shaped front portion of said plug extending axially into said second ring-shaped hole in said receptacle with the underside of the base of said truncated conical shaped front portion bearing on the interface between said first and second ring-shaped holes thereby locking said knob on said stem and preventing axial separation of the coupling.

3. A coupling comprising a first plug-shaped male connector, a second plug-shaped male connector in axial alignment with said first male connector but facing opposite, said first and second male connectors each having a rectangular prismoidal shaped rear portion, a ring shaped central portion, and a short truncated conical shaped front portion with a base diameter greater than the diameter of the central portion but less than the width of said rectangular shaped rear portion; a cylindrical shaped female connector having a rear face and a front face, a first receptacle extending inwardly from said rear face, a second receptacle in axial alignment with said first receptacle but facing opposite and extending inwardly from said front face, said first and second receptacles being configured to receive said first and second male connectors, said first and second receptacles each having the following coaxial cavities in tandem, a rectangular shaped hole, an annular groove, a first ring-shaped hole having a diameter less than said base diameter of said truncated conical shaped front portion of said male connectors, and a blind second ring-shaped hole having a diameter greater than said base diameter of said truncated conical shaped front portion of said male connectors; said rectangular prismoidal shaped rear portions of said first and second male connectors respectively received in said rectangular holes in said first and second receptacles to prevent rotation between said first and second male connectors and said female connector, said truncated conical shaped front portions of said first and second male connectors respectively extending axially into said second ring-shaped holes in said first and second receptacles in said female connector with the underside of said base of each conical shaped front portion bearing on the interface between said first and second ring-shaped holes in each receptacle in said female connector, thereby locking said first and second male connectors and said female connector together and preventing separation of the coupling.

4. A multi-shaft coupling comprising a polytetrafluoroethylene plastic plug shaped male connector integral with and terminating one end of each shaft, each of said male connectors having a rectangular prismoidal shaped rear portion, a ring shaped central portion, and a short truncated conical shaped front portion with a base diameter greater than the diameter of said central portion but less than the width of said rectangular shaped rear portion; a cylindrical shaped polytetrafluoroethylene plastic female connector having a rear face, a front face, and a plurality of receptacles extending inwardly from said rear and front faces and configured to receive said male connectors, each of said receptacles having the following coaxial cavities in tandem, a rectangular shaped hole, an annular groove, a first ring-shaped hole having a diameter less than said base diameter of said truncated conical shaped front portion of said male connector, and a blind second ring-shaped hole having a diameter greater than said base diameter of said truncated conical shaped front portion of said male connector; pairs of said male and female connectors coupled together, said rectangular prismoidal shaped rear portion of said male connector received in said rectangular hole in said female connector to prevent rotation between each pair of said male and female connectors, said truncated conical shaped front portion of said male connector extending axially into said second ring-shaped hole in said female connector with the underside of said base of said truncated conical shaped front portion bearing on the interface between said first and second ring-shaped holes to lock each pair of said male and female connectors together and to prevent axial separation.

5. In a valve for fluids, a body portion comprising three interconnecting tubes including an inlet tube, an outlet tube, and a tube having a partially threaded bore; a polytetrafluoroethylene plastic valve stem longitudinally disposed in said threaded bore and provided with screwable adjusting means to regulate the movement of said stem, a first plug integral with said stem at its front end and having a rectangular prismoidal-shaped rear portion, a ring-shaped central portion, and a short truncated conical-shaped front portion; a polytetrafluoroethylene plastic extension rod adapted for the remote turning of said stem, a second plug integral with said extension rod at its front end and having a rectangular prismoidal shaped rear portion, a ring-shaped central portion, and a short truncated conical shaped front portion; means for turning said extension rod attached to its rear end; a cylindrical-shaped female connector having a rear face and a front face, a first receptacle extending inwardly from said rear face, a second receptacle in axial alignment with said first receptacle but facing opposite and extending inwardly from said front face, said first and second receptacles being configured to receive said first plug integral with said stem at its front end and said second plug integral with said extension rod at its front end, said first and second receptacles each having the following coaxial cavities in tandem, a rectangular-shaped hole, an annular groove, a first ring-shaped hole having a diameter less than said base diameter of said truncated conical-shaped front portion of said male plugs, and a blind second ring-shaped hole having a diameter greater than said base diameter of said truncated conical shaped front portion of said first and second male plugs; said rectangular prismoidal shaped rear portions of said first and second plugs respectively received in said rectangular holes in said first and second receptacles to prevent rotation between said first and second male plugs and said female connector, said truncated conical shaped front portions of said first and second male plugs respectively received in said second ring-shaped holes in said first and second receptacles in said female connector with the underside of said base of each conical shaped front portion bearing on the interface between said first and second ring-shaped holes in each receptacle in said female connector, thereby locking said first and second male plugs and said female connector together and preventing separation of the coupling.

References Cited

UNITED STATES PATENTS

| | | | |
|---|---|---|---|
| 2,171,361 | 8/1939 | Gits et al. | 287—5 X |
| 2,655,041 | 10/1953 | Jacobsson | 251—122 X |
| 2,831,711 | 4/1958 | Leadbetter | 285—423 X |
| 2,833,512 | 5/1958 | Sanborn | 251—368 X |
| 2,843,406 | 7/1958 | Wray | 287—119 X |
| 2,985,469 | 5/1961 | Bowman. | |
| 3,194,533 | 7/1965 | McLay | 251—368 X |

CARL W. TOMLIN, *Primary Examiner.*

A. V. KUNDRAT, *Assistant Examiner.*